No. 782,705. PATENTED FEB. 14, 1905.
C. S. SIMMONS & W. N. ROSE.
COTTON CHOPPER AND WEED CUTTER.
APPLICATION FILED SEPT. 20, 1904.
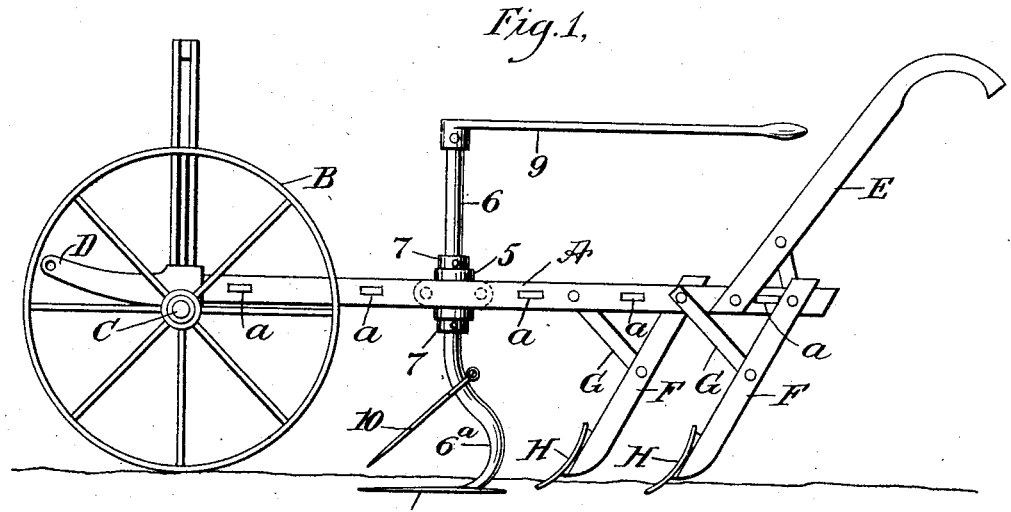
Fig. 1.
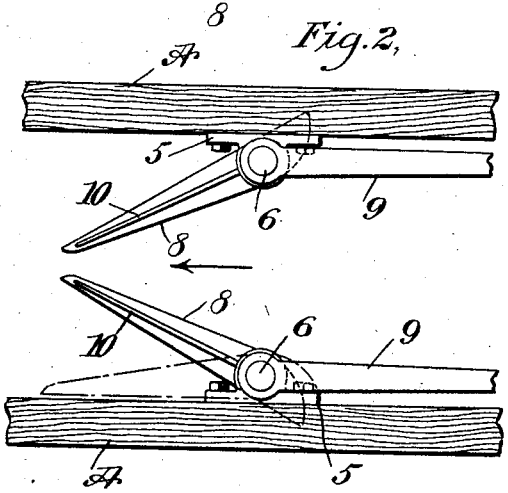
Fig. 2.
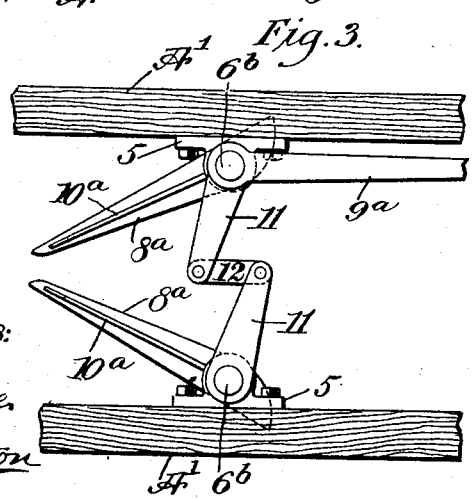
Fig. 3.
WITNESSES:
Edw. Thorpe
Wm P. Patton
INVENTORS
Charles S. Simmons
William N. Rose
BY
ATTORNEYS No. 782,705.  
Patented February 14, 1905.

UNITED STATES PATENT OFFICE.

CHARLES S. SIMMONS AND WILLIAM N. ROSE, OF CACHE, OKLAHOMA TERRITORY.

COTTON-CHOPPER AND WEED-CUTTER.

SPECIFICATION forming part of Letters Patent No. 782,705, dated February 14, 1905.

Application filed September 20, 1904. Serial No. 225,210.

*To all whom it may concern:*

Be it known that we, CHARLES S. SIMMONS and WILLIAM N. ROSE, citizens of the United States, and residents of Cache, in the county of Comanche and Territory of Oklahoma, have invented a new and Improved Cotton-Chopper and Weed-Cutter, of which the following is a full, clear, and exact description.

This invention has for its object to provide novel details of construction for a cotton-chopper and weed-killer that may be attached upon the frame of an ordinary corn or cotton cultivator or be mounted upon an individual frame and afford reliable means for cutting off weeds at their roots at the sides of rows of cotton-plants, cut out suckers and extraneous plants between such as are to be left standing, and also stir the soil between such standing plants in a row as the machine is progressively moved along the rows of plants.

The invention consists in the novel construction and combination of parts as is hereinafter described, and defined in the appended claims.

Reference is to be had to the accompanying drawings, forming a part of this specification, in which similar characters of reference indicate corresponding parts in all the figures.

Figure 1 is a side view of an ordinary cultivator and of the improved attachment mounted thereon. Fig. 2 is an enlarged plan view of the improvement mounted upon portions of the side beams of the cultivator, and Fig. 3 is a plan view of a modified arrangement for the improvement on the beams of a cultivator.

In the drawings that show the application of the improvement upon a double-beam cultivator, such as is in use for removing weeds and loosening the soil between rows of growing corn or of cotton-plants, A A represent the pair of side beams for the cultivator, that in this construction are held spaced apart in parallelism by a suitable number of transverse frame-bars $a$, the ends of which appear in Fig. 1. The forward ends of the side beams A are, as usual, supported at a proper distance from the ground by a pair of wheels, such as B, held to rotate on a transverse axle C, secured upon the side beams, an end of the axle appearing in Fig. 1.

Means for connecting a draft-animal to the front end of the cultivator-frame is shown at D in Fig. 1, and near the rear ends of the pair of side beams A the usual handles E are secured, one on each side beam, as represented for one beam in Fig. 1. Upon each beam A near their rear ends one or more standards F are secured by their upper ends, said standards, which incline downward and forward, being braced by struts G, that extend from the beams A downward and rearward to engage the standards at a suitable distance below the beams.

Upon the lower ends of the standards F the usual shovel-plow blades H are secured, which are adapted for the loosening of soil through which they are drawn and also for the killing of weeds that may grow between rows of corn or cotton-plants. The cultivator just described may be advantageously employed for coöperation with the improvement which will now be described.

Upon each side beam A forward of the standards F is secured a journal-box 5, adapted to support vertically the main portion of a shaft 6, held to rotate therein at a desired point on the shaft by the collars 7 7, which are mounted upon the shaft and are secured thereto respectively above and below the beam A upon which the box is mounted. The portion of each shaft 6 which extends below the beam A is preferably bent into substantially S shape at $6^a$, so that the lower portion thereof inclines downward and forward, as shown in Fig. 1, for one shaft. Upon the lower end of the bent portion $6^a$ of each shaft 6 is secured the cutter-blade 8 near its rear end and upon the upper side thereof. As shown in Figs. 1 and 2, the cutter-blades 8 each are nearly flat plates of suitable metal, which are pointed edgewise at their front ends and diverge at said edges rearward, thus producing cutters that taper edgewise forwardly, and both edges of each cutter-blade may be sharpened, thus adapting the blades to sever weeds and vines or cut off surplus growths of cotton-plants, as will presently be explained. The shafts 6 extend a suitable height above the beams A, and upon the upper end of each shaft is secured one end of a lever 9, said levers projecting rearward, so that their free ends, which serve as handles, may be conveniently grasped by the plowman who controls the movement of the cultivator by means of the handles E. The levers 9 are so disposed with regard to the respective cutter-blades 8 that when the levers are about parallel with the beams A and with each other the points of the cutter-blades are inclined an equal degree toward each other, as shown in Fig. 2.

Upon each of the shafts 6 below the beams A a finger-bar 10 is secured, which bars incline downward and are positioned directly above the cutter-blades 8, as shown in Fig. 2. The relative position of the levers 9 adapts the rocking movement of said levers toward each other to correspondingly rock the cutter-blades 8 outwardly or away from each other at their points.

In using the machine for the cultivation of corn or cotton-plants that are arranged in rows, and which may require thinning out by removal of the surplus plants at spaced intervals in each row, the machine is moved by applied power along between two rows, which will permit the cultivator-blades H to be employed for uprooting weeds and the agitation of the soil between the rows of growing plants. Simultaneously with the progressive movement of the shovel-plow blades H the plowman manipulates the levers 9 so as to laterally rock the blades 8, this vibration of the blades causing them to pass outwardly between standing stalks of cotton-plants and cut off surplus growths of the plants, as well as weeds, vines, or the like that should be killed. It will be seen that by spreading apart the cutter-blades so that they are positioned as indicated by dotted lines in Fig. 2 the weeds and stalks that have been cut and that may hang upon the blades will by the frictional contact of the ground be stripped from the cutter-blades so that they may in this way be kept in operative condition. The normal position of the cutter-blades 8 causes them to become embedded in the soil at each side of a row of plants, and they may approach the roots of the growing plants, but not near enough to injure them, which adjustment occurs when the levers 9 are disposed parallel with each other, as shown in Fig. 2. As the finger-bars 10 are positioned directly above the cutter-blades 8 at their transverse centers, said bars will indicate the exact positions of the cutter-blades that are being vibrated beneath the surface of the soil, which will enable the operator to safely control the degree of lateral movement that may be given to the cutter-blades and also indicate when such movements will be safely effected.

In Fig. 3 is shown a means for connecting the spaced cutter-blades $8^a$ so that both may be actuated in opposite directions at the same time by the use of a single lever $9^a$. To this end a crank arm 11 is secured on the body of each shaft $6^b$, preferably above the beams A, as is shown in Fig. 3. Upon the outer ends of the crank-arms 11 corresponding ends of a link-bar 12 are pivoted, and, as shown, the blades $8^a$ are equally inclined toward each other when the link-bar is disposed midway between the beams A. The lever $9^a$ is secured upon the upper end of one of the shafts $6^b$, preferably the one carried by the beam A' that is at the right side of the cultivator-frame, and said lever is arranged parallel to the beam when the points of the cutter-blades $8^a$ approach each other. Indicating finger-bars $10^a$ are secured on the shafts $6^b$ above the cutter-blades $8^a$. The operation of this example of our invention is the same as that already described, with the exception that the blades $8^a$ may be rocked laterally by means of the single lever $9^a$, and thus be moved between growing plants for cultivation of the soil and killing of weeds or surplus growths of such plants.

It is obvious that the improved cotton-chopping and weed-killing mechanism may be mounted upon a cultivator-frame that has its members arranged differently from that herein specified—as, for example, the side beams may be converged at their forward ends instead of being held parallel with each other. Furthermore, the improvement may be mounted upon a frame that is adapted for progressive movement and dispense with the cultivator-plow blades, as well as the standards that they are mounted upon. In such an arrangement the cutter-blades serve to kill weeds, chop out surplus cotton-plants between those that are to be left standing in rows, and also to stir the soil, so as to loosen it up between rows of growing cotton-plants or corn that has been planted in rows and needs thinning out to render it productive of grain.

Slight changes in constructive details may resorted to within the scope of the invention as defined in the claims, it being understood that the invention embodies practical means for manually rocking one or more horizontal cutter-blades on a progressively-moved support therefor, so that the cutter blade or blades will while embedded in the soil be adapted to enter between standing spaced plants and chop out surplus growths as well as weeds, and at the same time loosen the soil between rows of plants as well as between plants in each row.

Having thus described our invention, we claim as new and desire to secure by Letters Patent—

1. The combination with a movable support, of an upright rockable shaft thereon, means for rocking said shaft, a cutter-blade projecting laterally from the lower end of said shaft, and an indicating-finger on the shaft above the cutter-blade.

2. The combination with a movable frame having two parallel side beams and boxes thereon, of a rockable shaft held in each box, a lever projected laterally from the upper end of each shaft, a cutter-blade projected in a horizontal plane from the lower end of each shaft and in an upright plane at an angle to that of the lever, and an indicating-finger on each shaft centrally above a respective cutter-blade thereon.

3. The combination with a movable frame having two side beams, an upright shaft held to rock on each of the side beams, arms on the shaft, a link between the arms, and means for rocking both shafts together, of a substantially flat cutter-blade on the lower end of each shaft and projecting therefrom at an angle to the vertical plane of the lever thereon, and an indicating-finger on each shaft directly above the cutter-blade thereon.

4. The combination with a cultivator-frame, shovel-blades supported on said frame, means adapting the frame for progressive movement, and means for guiding the cultivator, of two upright shafts held to rock on the side beams of the cultivator-frame, a lever on the upper end of each shaft, a substantially flat cutter-blade horizontally disposed and secured to project from the lower end of each shaft, and an indicating-finger secured on each shaft above a respective cutter-blade and in the same vertical plane therewith.

In testimony whereof we have signed our names to this specification in the presence of two subscribing witnesses.

CHARLES S. SIMMONS.
    WM. N. ROSE.

Witnesses:
 CASSIUS M. CLINGAN,
 W. E. PICKET.